US008830862B2

(12) United States Patent
Agarwal et al.

(10) Patent No.: US 8,830,862 B2
(45) Date of Patent: Sep. 9, 2014

(54) DATA CHANNEL ADAPTATION FOR MOBILE APPLICATIONS

(75) Inventors: Vikas Agarwal, Noida (IN); Sumit Mittal, Noida (IN); Venkatraman Ramakrishna, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 13/593,637

(22) Filed: Aug. 24, 2012

(65) Prior Publication Data
US 2014/0056154 A1 Feb. 27, 2014

(51) Int. Cl.
*H04W 72/02* (2009.01)
*H04W 24/00* (2009.01)
*H04W 88/06* (2009.01)
*H04W 4/02* (2009.01)
*H04W 72/08* (2009.01)
*H04W 72/04* (2009.01)
*H04W 72/10* (2009.01)

(52) U.S. Cl.
CPC ............... *H04W 88/06* (2013.01); *H04W 4/02* (2013.01); *H04W 72/08* (2013.01); *H04W 72/0493* (2013.01); *H04W 72/10* (2013.01)
USPC ............................ 370/252; 370/329; 370/338

(58) Field of Classification Search
CPC ....... H04W 88/06; H04W 4/02; H04W 72/08; H04W 72/0493; H04W 72/10
USPC ........................................................ 370/329
See application file for complete search history.

(56) References Cited

U.S. PATENT DOCUMENTS

| 6,122,514 A | 9/2000 | Spaur et al. |
| 6,516,192 B1 | 2/2003 | Spaur et al. |
| 7,853,261 B1 | 12/2010 | Lewis et al. |
| 8,027,293 B2 | 9/2011 | Spaur et al. |
| 2003/0003922 A1 | 1/2003 | McClure |
| 2003/0118015 A1 | 6/2003 | Gunnarsson et al. |

(Continued)

FOREIGN PATENT DOCUMENTS

CN 101107869 A1 1/2008

OTHER PUBLICATIONS

Pawar et al. Towards location based Qos-aware network selection mechanism for the nomadic mobile services. Consumer Communications and Networking Conference, 2009. CCNC 2009. 6th IEEE Date of Conference: Jan. 10-13, 2009.

(Continued)

*Primary Examiner* — Min Jung
(74) *Attorney, Agent, or Firm* — Ryan, Mason & Lewis, LLP (57) ABSTRACT

Techniques, an apparatus and an article of manufacture for data channel adaptation for mobile applications. A method includes determining user presence information based on tracking of user movement patterns, wherein presence is a user's characteristic location in a given time period, determining at least one connectivity characteristic in each of multiple data channels available to the user for running a mobile device application based on the user presence information, comparing the multiple data channels based on the at least one connectivity characteristic in each data channel in connection with priority specified by the user and/or at least one requirement of the mobile device application, and automatically selecting the data channel for running the mobile device application to maximize utility based on priority of the application and/or the at least one requirement of the mobile device application.

15 Claims, 4 Drawing Sheets

(56) References Cited

U.S. PATENT DOCUMENTS

| | | |
|---|---|---|
| 2005/0059397 A1 | 3/2005 | Zhao |
| 2005/0239497 A1* | 10/2005 | Bahl et al. .................. 455/552.1 |
| 2005/0254435 A1* | 11/2005 | Moakley et al. .............. 370/252 |
| 2006/0084417 A1* | 4/2006 | Melpignano et al. ......... 455/418 |
| 2009/0005041 A1* | 1/2009 | Steinberg et al. .......... 455/435.2 |
| 2010/0003988 A1 | 1/2010 | Buckley et al. |
| 2010/0128664 A1 | 5/2010 | Denny et al. |
| 2010/0184440 A1 | 7/2010 | Mao et al. |
| 2011/0116453 A1 | 5/2011 | Huang et al. |
| 2011/0286437 A1 | 11/2011 | Austin et al. |
| 2012/0188876 A1* | 7/2012 | Chow et al. ................... 370/237 |
| 2013/0315144 A1* | 11/2013 | Karaoguz et al. ............. 370/328 |
| 2013/0329666 A1* | 12/2013 | Degani et al. ............... 370/329 |

OTHER PUBLICATIONS

Shen et al. Cost-function-based network selection strategy in integrated wireless and mobile networks. Vehicular Technology, IEEE Transactions on Date of Publication: Nov. 2008.

* cited by examiner

DATA CHANNEL ADAPTATION FOR MOBILE APPLICATIONS

FIELD OF THE INVENTION

Embodiments of the invention generally relate to information technology, and, more particularly, to mobile communication.

BACKGROUND

Mobile devices such as smart phones and tablets can typically communicate data using both Wi-Fi and cellular networks. Wi-Fi networks can include, for example, wireless local area networks (LANs) or Worldwide Interoperability for Microwave Access (WiMax), and cellular networks can include, for example, general packet radio service (GPRS) or third generation (3G) technology. Bluetooth technology can also be used. Additionally, some devices support multiple subscriber identity modules (SIMs), and therefore have multiple cellular network channels available for communication.

However, communication channels are not equal in terms of parameters such as availability, cost and quality. For example, Wi-Fi networks are available only in hot spots (that is, such networks are not seamless), they are often free to use (though may have access controls), and the quality is variable. In contrast, cellular networks have widespread availability (that is, such networks are mostly seamless), they incur monetary charges (varying from prepaid to plan-based), and the quality is technology-dependent.

Service providers can offer a variety of plans from which users can choose. For instance, plans can include usage charges that vary with location and time, pay-as-you-go plans, and unlimited usage plans for a fixed amount at a given bandwidth. Devices hosting multiple SIMs can additionally offer users an option to choose data plans on a per-application basis.

However, exclusively using one channel (either Wi-Fi or the cell network) for all applications might not be the most advantageous option for a user. Different applications have different quality of service (QoS) requirements, and depending on the current location and anticipated user movements (referred to herein as presence), it may be advantageous to use a pervasive charge-incurring cell network over a free Wi-Fi network that has variable signal strength and limited coverage. Further, the cost incurred by a user will likely vary with the data communication plan he/she uses.

SUMMARY

In one aspect of the present invention, techniques for data channel adaptation for mobile applications are provided. An exemplary computer-implemented method for automatically selecting a data channel for a mobile application can include steps of determining user presence information based on tracking of user movement patterns, wherein presence is a user's characteristic location in a given time period, determining at least one connectivity characteristic in each of multiple data channels available to the user for running a mobile device application based on the user presence information, comparing the multiple data channels based on the at least one connectivity characteristic in each data channel in connection with priority specified by the user and/or at least one requirement of the mobile device application, and automatically selecting the data channel for running the mobile device application to maximize utility based on priority of the application and/or the at least one requirement of the mobile device application.

Another aspect of the invention includes a system for automatically selecting a data channel for a mobile application, which includes a memory, at least one processor coupled to the memory, and distinct software modules, each distinct software module being embodied on a tangible computer-readable medium and executing on the at least one processor. The distinct software modules include a presence determining module, which interacts with a global positioning system component and/or a cell tower identifier component to determine user presence information, wherein presence is a user's characteristic location in a given time period;

an application monitoring module, which determines at least one requirement of a mobile device application;

a channel monitoring and metering module, which determines at least one connectivity characteristic of multiple data channels available to the user for running the mobile device application based on the user presence information; and a data channel selection module, which automatically selects the data channel for running the mobile device application that maximizes utility based on comparison of the at least one connectivity characteristic in each data channel in connection with priority specified by the user and/or at least one requirement of the mobile device application.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes providing data channel adaptation for mobile applications based on user context and telecommunications (telecom) plans. For example, at least one embodiment of the invention includes intelligent data communication channel selection for applications running on a mobile device based on user context and telecom plan characteristics. A mobile device senses and learns contexts through in-built and/or configured sensors, and can automatically select channels on a per-application basis in a way that is transparent to a user and/or application developer.

Additionally, at least one embodiment of the invention includes a mechanism (for example, a component included as part of mobile device operating system (OS)) that learns user presence. Presence is defined herein as a user's characteristic location in a given time period (for example, averaged over a long term). By way of example, user presence can be determined using the mobile device's global positioning system (GPS), and/or cell tower identifier (ID) information. Additionally, the mobile device can associate a user's presence region with the availability of data communication channels. Also, at least one embodiment of the invention can incorporate user location, current time, network signal strengths, learned common user movements, and network channel usage.

Further, as detailed herein, at least one embodiment of the invention includes incorporating a user's telecom plan and usage information by, for example, monitoring and metering usage of telecom data channels. Network conditions and user context can be monitored and determinations can be made as to whether changes will occur in the near future by examining the user's long-term presence data. Additionally, an aspect of the invention can include learning usage characteristics of different applications. For instance, the typical length of an application session can be used to assist in determining the most appropriate channel for that application.

In at least one embodiment of the invention, a cost/benefit utility function can be applied to determine the communication channel to use (among the available Wi-Fi and cellular network options) at a given time or in connection with a given application to maximize utility based on user priorities.

Selecting a suitable data communication channel for every application running on a mobile device can be based, for example, on the quality of service (QoS) requirements of the applications, the user's context and probabilistic presence, and the financial cost of available telecom network data plans. As noted, in existing approaches, the user must manually switch to a desired network based upon his/her perception, which may not be very accurate and often presents a cumbersome process for a user. Accordingly, at least one embodiment of the invention provides automated mobile data communication channel adaptation.

As noted, an aspect of the invention can include using long-term presence and current context of a user to intelligently select data communication channels. This aids in ensuring long-lived application sessions irrespective of context changes. Parameters that can be considered can include, for example, current user location, current time, signal strengths of available cellular and Wi-Fi networks, learned user movements, and usage patterns of network channels.

Additionally, as noted, at least one embodiment of the invention includes incorporating telecom data plan characteristics to determine what channel to use in what context so that the user incurs minimal cost. A user can have multiple data channels and corresponding plans (and costs) for each channel. Also, each plan may have a fixed free usage limit and subsequent paid usage above that limit. Moreover, the rate of charge may vary from one channel to other channels. Further, channel characteristics can also vary in terms of bandwidth available, jitter, etc. Accordingly, such parameters are taken into account together with application requirements to determine the most appropriate channel for an application.

At least one embodiment of the invention also includes learning usage characteristics of different applications and using that information to aid in selecting the most appropriate channel for each application. For example, application usage can be monitored over time to learn how the application utilizes the network. By way of example, it can be monitored and learned whether the application requires long uninterrupted sessions to provide adequate QoS, whether the communication pattern of the application is bursty, etc. QoS requirements of an application can be matched with channel capabilities.

As such, the techniques detailed herein facilitate each application using the network channel that delivers the most benefit, which can manifest itself in the form of, for example, QoS, connection continuity, battery usage optimization, etc.

Figure 1:
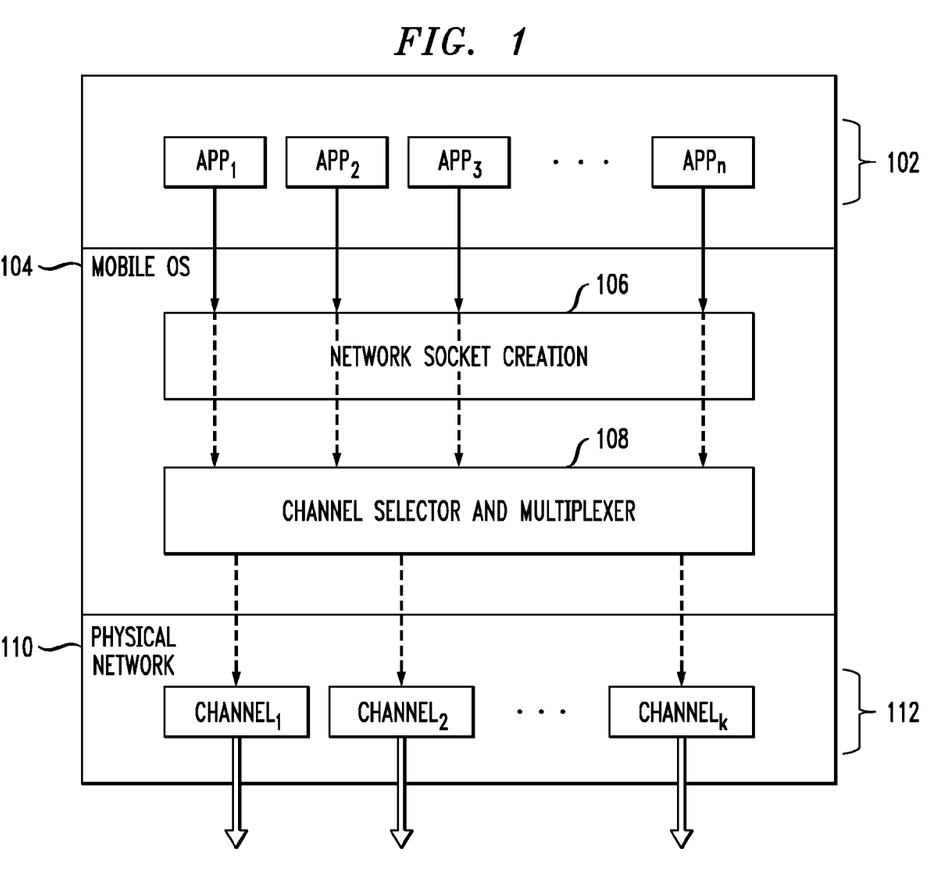
FIG. 1 is a diagram illustrating system architecture, according to an embodiment of the present invention.

FIG. 1 is a diagram illustrating system architecture, according to an embodiment of the present invention. By way of illustration, FIG. 1 depicts applications 102, a mobile operating system (OS) 104 and a physical network 110. The mobile OS 104 includes a network socket creation component 106 and a channel selector and multiplexer component 108, and the physical network 110 includes the available channels 112.

FIG. 1 is an example representation of a layered network protocol stack. Data flows into and out of applications 102 through network sockets (one per application) that are managed by the mobile OS 104. At least one embodiment of the invention includes incorporating another module or layer just above the physical layer. A data packet that reaches this layer has already been tagged with a flow identifier (indicating the application class to which it belongs). Using this flow identifier and the channel selection criteria built up in its database, the channel selector and multiplexer module 108 determines which physical channel (Wi-Fi, cellular network, bluetooth, etc.) through which to send the packet. This operation is to be performed only in the context of data outflow. Inflow is handled using the regular data communication procedure with the channel selector and multiplexor module 108 not playing any role.

In connection with use of the channel selector multiplexer component 108, each channel can have its own corresponding interface, and the component 108 computes a function such that <application>→<interface>, and forwards a packet to <interface>.

Figure 2:
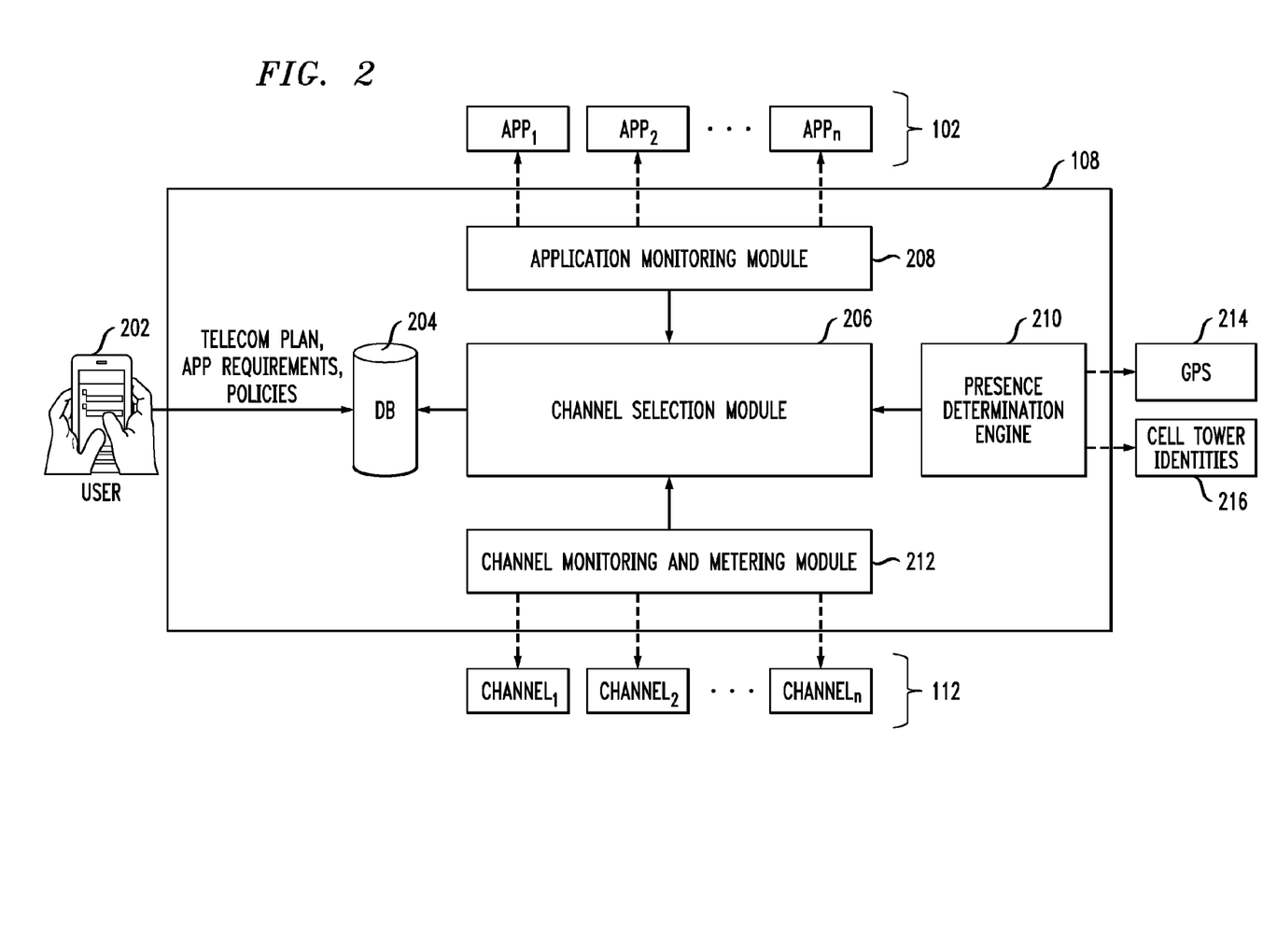
FIG. 2 is a diagram illustrating a channel selector and multiplexer component, according to an embodiment of the invention.

FIG. 2 is a diagram illustrating the channel selector and multiplexer component 108, according to an embodiment of the invention. By way of illustration, the channel selector and multiplexer component 108 includes a channel selection module 206, an application monitoring module 208, a presence determining engine 210, a channel monitoring and metering module 212, and a database 204. As depicted in FIG. 2, a user 202 can input information such as telecom plan details, application requirements and policies to the database 204. Also, the application monitoring module 208 monitors applications 102 to gather behavior information and provides the information to the channel selection module 206, while the channel monitoring and metering module 212 monitors the quality of the available channels 112 and provides information to the channel selector module 206. Additionally, the presence determination engine 210 monitors user location using a GPS device 214 and/or signals from a cell tower ID component 216 and provides information to the channel selector module 206. Further, the channel selection module 206 can provide information to the database 204.

As illustrated in FIG. 2, the channel selection module 206 is the recipient of periodic updates from each of the information gathering modules (that is, modules 208, 210 and 212). Also, the database 204 stores both the user's preferences and periodic computations and revisions made by the channel selection module 206 based on information receives from the information gathering modules.

In at least one embodiment of the invention, one or more prerequisites for channel selection may exist. By way of example, characteristics of each application (app) can be determined or set. Such application characteristics can include, for instance, quality of service requirements, including upper and lower limits. Another application characteristic can include continuous network connectivity requirements, which includes a determination as to whether the app will tolerate connectivity breaks. Yet another application characteristic can include priority of an application, which can be set by a user.

Additionally, characteristics of network channels can be determined or set. Such characteristics can include, for example, cost of usage and/or telecom plan, maximum and minimum bandwidth available, and connectivity/coverage over a geographical area. Further, application developers and users can specify policies that reflect an importance of one or more characteristics attached to an application, such as the cost of using a cell network, quality of service, tolerating temporary connectivity breaks, etc.

As also described herein, an aspect of the invention includes presence determination and usage. As noted, presence is used herein to refer to a user's characteristic location in a given time period. At least one embodiment of the invention includes building a table of characteristic user locations in fixed-size time slots. Further, at least one embodiment of the invention includes predicting a user's movements based on recorded user movements learnt over time. Additionally, data channel coverage information can be appended to presence regions. For example, presence table entries can correspond to a fixed time period (a week divided into two-hour slots, etc.) and can contain locations and available data channels with signal strengths in that time period.

In collecting presence information, at least one embodiment of the invention can include determining location information using GPS or cell tower-id information, and tracking user movements through GPS logged along with corresponding times and observed network signal strengths.

By way of example, presence information can be used for predicting whether a Wi-Fi connection will be available in an upcoming time period. In such an example situation, a costly GPRS mechanism can be chosen, for instance, over Wi-Fi if a long-lived connection is to be required. Similarly, if multiple SIMs are hosted by a device, coverage of two different networks can also be compared.

At least one embodiment of the invention additionally includes network monitoring, wherein each data channel can be monitored and current signal strength and available bandwidth can be recorded. Further, usage of available telecom/cellular network channels can be monitored, a wrapper can be created over the network send call, and usage of each channel can be recorded in the operating system logs. The purpose of the wrapper is to overload/enhance the existing "send" system call (or function) to (i) monitor, and (ii) record/log characteristics of the channel usage in addition to the basic task of sending data (which is performed by the existing "send" call/function). Also, an application can be monitored to observe and record the time duration of each application session over the available data communication channels. This can involve, for example, monitoring open and close network calls.

In connection with the channel selection module (component 208 in FIG. 2), an aspect of the invention includes a channel selection algorithm to be applied to each application. Accordingly, for each network channel, a utility function set $\{f_1, f_2, \ldots, f_n\}$ is generated. Each function is a measure of the value (on a 0-1 scale) that the channel provides on a given characteristic. For example: $f_1$ represents cost; $f_1$(free Wi-Fi)=1, $f_1$(2G)>$f_1$(3G); Wi-Fi is free, and a 3G connection is costly. In a separate example: $f_2$ represents QoS satisfaction; $f_2$(4G)>$f_2$(WiFi)>$f_2$(2G). In yet another example: $f_3$ represents connection continuity; $f_3$(2G)>$f_3$(WiFi), and $f_3$(3G)>$f_3$(WiFi), modulo current context.

At least one embodiment of the invention includes generating weights (representing priorities) for each characteristic $\{w_1, w_2, \ldots, w_n\}$, and computing the weighted utility such as, for example, $$\sum_{i=1}^{n} w_i f_i.$$

Accordingly, the network channel with the highest weighted utility is selected. Additionally, in at least one embodiment of the invention, the channel selection algorithm is run at periodic intervals in the channel selection module 208 that is part of the mobile device operating system.

By way of illustration, consider the following example use cases. One example use case aims to minimize a subscriber's phone bill on average. Accordingly, an application can be written that will take a user's post paid plan details as input and dynamically control the channel selection policy (by configuring the weighted functions). Another example use case aims to improve reliability of connectivity-dependent applications (such as large file downloads) in the face of mobility. Accordingly, a learning module can keep track of characteristic user locations and movements, the wireless networks associated with those locations, and the coverage limits of those networks. Targeted applications will switch to using ubiquitous cellular networks instead of Wi-Fi as and when necessary.

Figure 3:
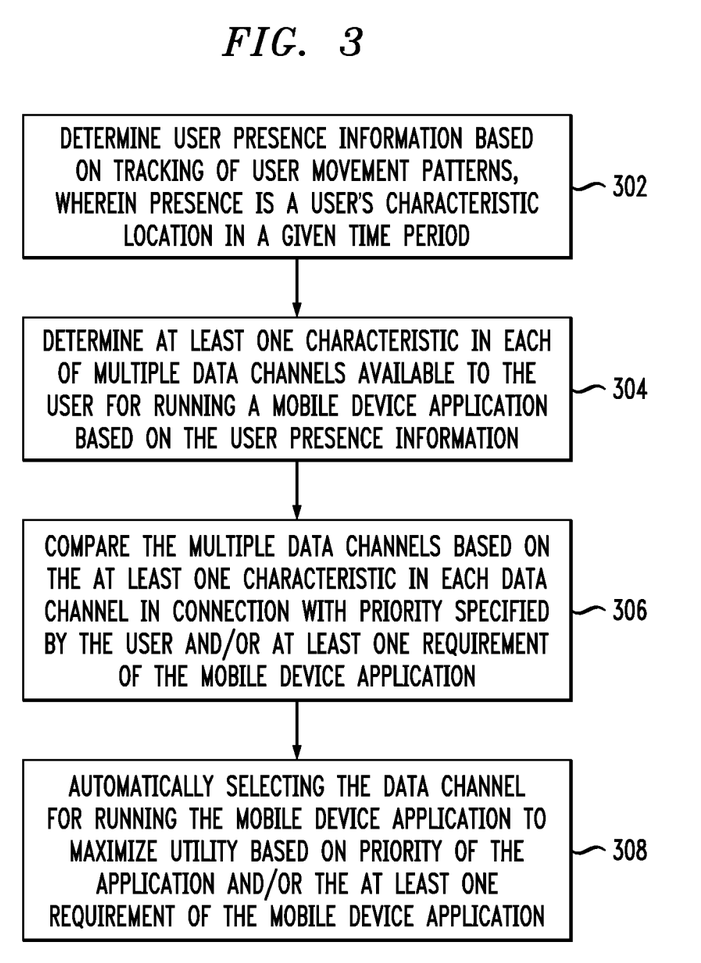
FIG. 3 is a flow diagram illustrating techniques for automatically selecting a data channel for a mobile application, according to an embodiment of the invention.

FIG. 3 is a flow diagram illustrating techniques for automatically selecting a data channel for a mobile application, according to an embodiment of the present invention. Step 302 includes determining user presence information based on tracking of user movement patterns, wherein presence is a user's characteristic location in a given time period. Determining user presence information comprises using a global positioning system (GPS) on the user's mobile device and/or using cell tower identifier (ID) information.

Step 304 includes determining at least one connectivity characteristic of multiple data channels available to the user for running a mobile device application based on the user presence information. As detailed herein, the data channels can include Wi-Fi and at least one cellular network. Additionally, characteristics of data channels can include, for example, cost of usage, maximum and minimum available bandwidth, and/or coverage over a geographical area, and/or jitter.

Step 306 includes comparing the multiple data channels based on the at least one connectivity characteristic in each data channel in connection with priority specified by the user and/or at least one requirement of the mobile device application. Step 308 includes automatically selecting the data channel for running the mobile device application to maximize utility based on the application's priority and/or the at least one requirement of the mobile device application. Selecting the data channel serves the purpose of minimizing the overall cost of using the mobile device for data communication.

The techniques depicted in FIG. 3 can also include learning at least one usage characteristic of the mobile device application. Usage characteristics can include, for example, duration of an application session, a quality of service requirement, and/or a network connectivity requirement. Additionally, at least one embodiment of the invention includes incorporating at least one characteristic of a telecom data plan of the user. The telecom data plan of the user can provide information pertaining to data channels available to the user and a corresponding cost for each data channel.

Further, the techniques depicted in FIG. 3 can include incorporating an application developer policy and/or a user-specified policy pertaining to priority of one or more application characteristics. Also, as described herein, a user's movements can be predicted based on user presence information learned over time.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
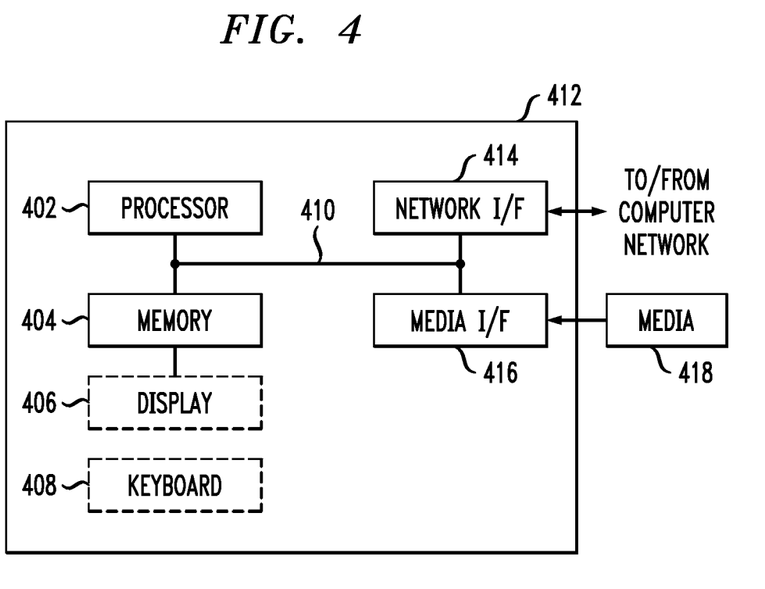
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming to language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, using long-term presence and current context of a user to intelligently select data communication channels.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically selecting a data channel for a mobile device application, the method comprising:
    determining user presence information based on tracking of user movement patterns, wherein presence is a user's characteristic location in a given time period;
    determining multiple connectivity characteristics for each of multiple data channels available to the user for running a mobile device application based on the user presence information, wherein the multiple connectivity characteristics for each of the multiple data channels comprise (i) cost of usage, (ii) maximum and minimum available bandwidth, (iii) coverage over a given geographical area, and (iv) jitter;
    determining multiple usage characteristics of the mobile device application, wherein the multiple usage characteristics comprise (i) duration of a session of the mobile device application, (ii) a quality of service requirement associated with the mobile device application, and (iii) a network connectivity requirement associated with the mobile device application;
    comparing the multiple data channels based on (i) the multiple connectivity characteristics for each of the multiple data channels, (ii) priority specified by the user, and (iii) the multiple usage characteristics of the mobile device application; and
    automatically selecting one of the multiple data channels for running the mobile device application to maximize utility based on said comparing;
    wherein at least one of the steps is carried out by a computer device.

2. The method of claim 1, wherein determining user presence information comprises using a global positioning system (GPS) on the user's mobile device.

3. The method of claim 1, wherein determining user presence information comprises using cell tower identifier (ID) information.

4. The method of claim 1, wherein the data channels comprise Wi-Fi and at least one cellular network.

5. The method of claim 1, wherein said automatically selecting comprises minimizing the overall cost of using the mobile device for data communication.

6. The method of claim 1, wherein said automatically selecting is further based on at least one characteristic of a telecom data plan of the user.

7. The method of claim 6, wherein the telecom data plan of the user provides information pertaining to data channels available to the user and a corresponding cost for each data channel.

8. The method of claim 1, wherein said automatically selecting is further based on an application developer policy and/or a user-specified policy pertaining to priority of one or more application characteristics.

9. The method of claim 1, comprising predicting the user's movements based on user presence information learned over time.

10. An article of manufacture comprising a computer readable storage medium having computer readable instructions tangibly embodied thereon which, when implemented, cause a computer to carry out a plurality of method steps comprising:
    determining user presence information based on tracking of user movement patterns, wherein presence is a user's characteristic location in a given time period;
    determining multiple connectivity characteristics for each of multiple data channels available to the user for running a mobile device application based on the user presence information, wherein the multiple connectivity characteristics for each of the multiple data channels comprise (i) cost of usage, (ii) maximum and minimum available bandwidth, (iii) coverage over a given geographical area, and (iv) jitter;
    determining multiple usage characteristics of the mobile device application, wherein the multiple usage characteristics comprise (i) duration of a session of the mobile device application, (ii) a quality of service requirement associated with the mobile device application, and (iii) a network connectivity requirement associated with the mobile device application;
    comparing the multiple data channels based on (i) the multiple connectivity characteristics for each of the multiple data channels, (ii) priority specified by the user, and (iii) the multiple usage characteristics of the mobile device application; and
    automatically selecting one of the multiple data channels for running the mobile device application to maximize utility based on said comparing.

11. The article of manufacture of claim 10, wherein determining user presence information comprises using a global positioning system (GPS) on the user's mobile device.

12. The article of manufacture of claim 10, wherein the data channels comprise Wi-Fi and at least one cellular network.

13. The article of manufacture of claim 10, wherein the method steps comprise incorporating at least one characteristic of a telecom data plan of the user.

14. A system for automatically selecting a data channel for a mobile device application, comprising:
    at least one distinct software module, each distinct software module being embodied on a tangible computer-readable medium;
    a memory; and
    at least one processor coupled to the memory and operative for:

determining user presence information based on tracking of user movement patterns, wherein presence is a user's characteristic location in a given time period;

determining multiple connectivity characteristics for each of multiple data channels available to the user for running a mobile device application based on the user presence information, wherein the multiple connectivity characteristics for each of the multiple data channels comprise (i) cost of usage, (ii) maximum and minimum available bandwidth, (iii) coverage over a given geographical area, and (iv) jitter;

determining multiple usage characteristics of the mobile device application, wherein the multiple usage characteristics comprise (i) duration of a session of the mobile device application, (ii) a quality of service requirement associated with the mobile device application, and (iii) a network connectivity requirement associated with the mobile device application;

comparing the multiple data channels based on (i) the multiple connectivity characteristics for each of the multiple data channels, (ii) priority specified by the user, and (iii) the multiple usage characteristics of the mobile device application; and automatically selecting one of the multiple data channels for running the mobile device application to maximize utility based on said comparing.

15. A system for automatically selecting a data channel for a mobile device application, comprising:

a memory;

at least one processor coupled to the memory; and distinct software modules, each distinct software module being embodied on a tangible computer-readable medium and executing on the at least one processor, the distinct software modules comprising:

a presence determining module, which interacts with a global positioning system component and/or a cell tower identifier component to determine user presence information, wherein presence is a user's characteristic location in a given time period;

an application monitoring module, which determines multiple usage characteristics of a mobile device application, wherein the multiple usage characteristics comprise (i) duration of a session of the mobile device application, (ii) a quality of service requirement associated with the mobile device application, and (iii) a network connectivity requirement associated with the mobile device application;

a channel monitoring and metering module, which determines multiple connectivity characteristics for each of multiple data channels available to the user for running the mobile device application based on the user presence information, wherein the multiple connectivity characteristics for each of the multiple data channels comprise (i) cost of usage, (ii) maximum and minimum available bandwidth, (iii) coverage over a given geographical area, and (iv) jitter; and a data channel selection module, which automatically selects one of the multiple data channels for running the mobile device application that maximizes utility based on comparison of (i) the multiple connectivity characteristics for each of the multiple data channels, (ii) priority specified by the user, and (iii) the multiple usage characteristics of the mobile device application.

\* \* \* \* \*